United States Patent [19]

Task

[11] Patent Number: 4,554,544
[45] Date of Patent: Nov. 19, 1985

[54] DIFFUSE INCANDESCENT RUNWAY MARKER LIGHT APPARATUS FOR OVERT/COVERT OPERATION

[75] Inventor: Harry L. Task, Dayton, Ohio

[73] Assignee: The United States of America as represented by the Secretary of the Air Force, Washington, D.C.

[21] Appl. No.: 536,142

[22] Filed: Sep. 26, 1983

[51] Int. Cl.[4] .................. G08G 5/00; B64F 1/18
[52] U.S. Cl. ..................... 340/953; 313/116; 340/84; 340/947; 340/955; 362/62
[58] Field of Search ............ 340/947, 981, 950, 953, 340/952, 954, 955, 815.18, 84, 321; 362/227, 234, 252; 313/112, 116; 219/354

[56] References Cited

U.S. PATENT DOCUMENTS

| | | | |
|---|---|---|---|
| 2,039,647 | 5/1936 | House | 340/953 |
| 2,674,726 | 4/1954 | Williams | 340/953 |
| 2,816,277 | 12/1957 | Salkowski | 340/321 |
| 2,825,898 | 3/1958 | Stanley | 340/84 |
| 3,138,779 | 6/1964 | Murray, Jr. et al. | 340/26 |
| 3,457,545 | 7/1969 | Brown | 340/25 |
| 3,576,523 | 3/1971 | Lerbakken | 340/955 |
| 3,639,899 | 2/1972 | Ljungkull | 340/110 |
| 3,706,968 | 12/1972 | Turner, Jr. | 340/955 |
| 3,878,506 | 4/1975 | Young | 340/953 |
| 4,385,354 | 5/1983 | Hornfeld et al. | 340/952 |
| 4,386,292 | 5/1983 | Rothwell et al. | 313/112 |

Primary Examiner—James J. Groody
Assistant Examiner—Brent A. Swarthout
Attorney, Agent, or Firm—Donald J. Singer; John R. Flanagan

[57] ABSTRACT

A diffuse incandescent runway marker light apparatus has a housing with a visible light diffusing plate mounted in one end and an infrared light diffusing plate mounted in the other end, and a pair of incandescent light sources mounted in the housing and aimed toward the respective housing end plates. A switch, when flipped to a first position, turns on one light source for producing visible illumination and turns off the other light source. The switch, when flipped to a second position, turns off the one light source and turns on the other light source for producing infrared illumination. In such manner, the appropriate type of illumination for marking the runway for overt or covert landing operation may be selected. When the switch is flipped to a third position, both light sources are turned off.

4 Claims, 4 Drawing Figures

DIFFUSE INCANDESCENT RUNWAY MARKER LIGHT APPARATUS FOR OVERT/COVERT OPERATION

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to runway lighting and, more particularly, is concerned with apparatus which utilizes incandescent light with appropriate light transmission media to create diffuse runway marker lights suitable for battery operated, portable use in overt or covert operations.

2. Description of the Prior Art

The Air Force has requirements for a rapidly deployable, portable, austere runway light system. Such a system is needed to aid pilots in making successful night landings at unimproved austere landing sites for rapid deployment of troops or equiment. The ideal runway lighting system would use little power, be extremely lightweight and portable, and have sufficient visible intensity to be seen from several miles away.

The system that is presently serving as a portable austere runway lighting system uses battery operated (6 volt) incandescent lamps, each with a lenticular plastic dome cover over the top, commonly referred to as ELCO lamps. These lamps have not been totally satisfactory because of their relatively poor visibility. Poor visibility is due to the non-uniform light distribution produced by the ELCO lamp. Such problem makes this lamp unacceptable for use in austere runway lighting applications. Consequently, a need exists for an inexpensive, efficient and portable austere runway marker lighting system.

SUMMARY OF THE INVENTION

The present invention provides a diffuse incandescent runway marker light apparatus designed to satisfy the aforementioned needs. Its use of incandescent light with appropriate light transmission media to produce a diffuse runway marker light is unique. Also, the capability of switching a simple type of austere runway marker light from overt mode to covert mode of operation, or vice versa, is unique. The diffusion of the incandescent light greatly increases the partial coherence length of the light source which eliminates the twinkling effect observed with directly-viewed incandescent sources.

Accordingly, the present invention is directed to a diffuse incandescent runway marker light apparatus, which comprises the combination of: (a) a housing having a pair of open opposite ends; (b) a visible light diffusing plate mounted to the housing across one open opposite end thereof; (c) an infrared light diffusing plate mounted to the housing across the other open opposite end thereof; (d) a pair of incandescent light sources disposed within the housing, each source located adjacent and aimed toward a respective open end of the housing; (e) an electrical power source; and (f) means for switching on one or the other of the light sources so as to selectively produce diffuse visible illumination from one end of the housing or diffuse infrared illumination from the other end of the housing.

DETAILED DESCRIPTION OF THE INVENTION

Figure 1:
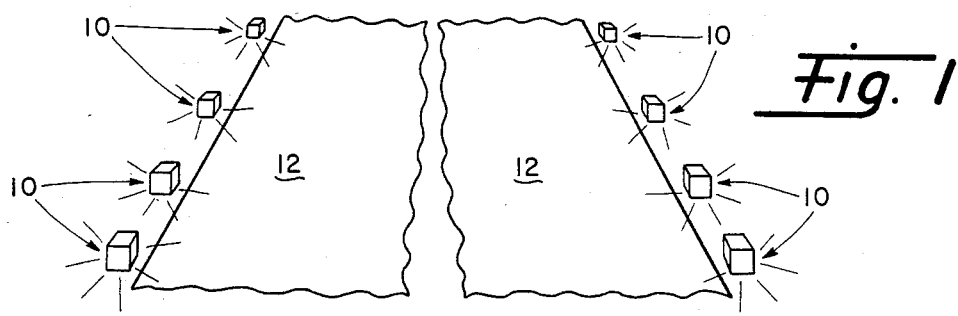
FIG. 1 is a fragmentary perspective view of an austere aircraft landing runway having the diffuse incandescent runway light apparatus of the present invention positioned along its opposite sides.

Referring now to the drawings, and more particularly to FIG. 1, there is shown a plurality of runway marker light apparatus of the present invention, generally designated 10, disposed at spaced positions along opposite sides of a runway 12. Each apparatus 10, as will be explained hereinafter, is capable of selective operation in an overt of covert mode for corresponding types of aircraft landing operation at the runway 12 which may be located in an austere, possibly hostile, environment.

Figure 2:
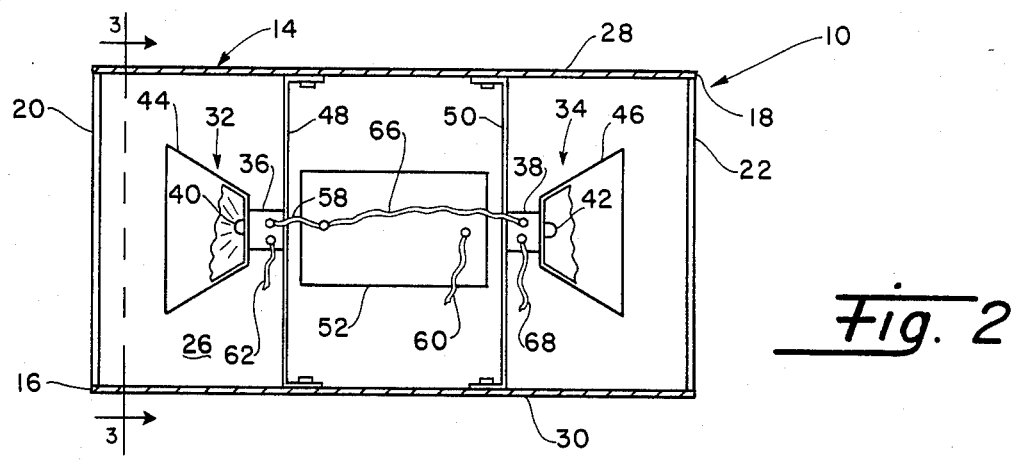
FIG. 2 is an enlarged top plan view of the runway light apparatus of FIG. 1 as seen along line 2—2 of FIG. 3.
Figure 3:
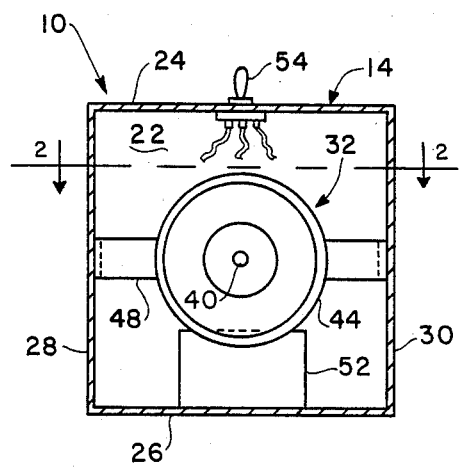
FIG. 3 is an enlarged front elevational view of the apparatus of FIG. 1 as seen along line 3—3 of FIG. 2.

As seen in FIGS. 2 and 3, the runway marker light apparatus 10 includes a housing 14 having open opposite ends 16, 18 and a pair of diffusing plates 20, 22 mounted to the housing 14 across the open ends 16, 18 thereof so as to close the same. More specifically, the housing 14 includes a pair of generally parallel top and bottom walls 24, 26 and a pair of generally parallel side walls 28, 30 which interconnect the top and bottom walls. The walls of the housing 14 together form a rectangular, box-like structure with the open opposite ends into which the plates 20, 22 are inserted.

The apparatus 10 further includes a pair of identical incandescent light sources, generally designated 32 and 34 respectively, each being located in the housing 14 adjacent and aimed toward one of the diffusing plates 20, 22 at the respective opposite ends 16, 18 of the housing 14. Basically, the light sources 32, 34 are respectively comprised of light socket bases 36, 38, incandescent light bulbs 40, 42, and frusto-conical shaped reflectors 44, 46. The socket bases 36, 38 are mounted between housing side walls 28, 30 by brackets 48, 50. Each of the reflectors 44, 46 extend toward a respective one of the diffusing plates 20, 22 for aiming or directing the light emanating from the respective one of the bulbs 40, 42 toward the plate.

Finally, the apparatus 10 includes a source of electrical power 52 for energizing the incandescent light bulbs 40, 42 and means in the form of a three-position switch 54 for switching on one or the other of the light bulbs. The power source 52 preferably takes the form of one or more direct current (1.5 volt) batteries. The plate 20 is of a type which diffuses visible light emanating to it from the incandescent light bulb 40, while plate 22 is of a type which passes and diffuses the infrared light contained in the light emanating from incandescent light bulb 42. By way of example, plate 20 may be composed from translucent Plexiglass material, while plate 22 may be composed from a cast acrylic sheet containing an appropriate dye agent, such as manufactured by Polycast Technology Corporation of Stamford, Conn.

Figure 4:
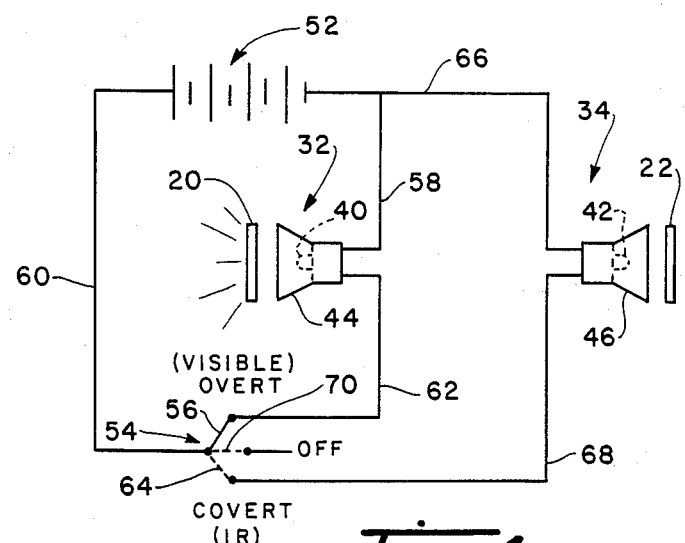
FIG. 4 is a schematic diagram of the electrical circuit incorporated by the runway light apparatus.

When the runway 12 is desired to be marked for overt (visible) landing operation, the plurality of marker light apparatus 10 are each placed along the runway with their end plates 20 facing toward the approaching aircraft (not shown). Then the switch 54 is flipped to a first position shown in solid line form at 56 in FIG. 4. In such first position of the switch 54, power source 52 is electrically connected (via leads 58, 60 and 62) through the switch to the one incandescent light bulb 40, turning it on and producing diffuse visible illumination from the plate 20 in the housing end 16 which faces toward the approaching aircraft. Simultaneously, the other incandescent light bulb 42 aimed toward the other plate 22 is disconnected from the power source 52 and thereby turned off.

On the other hand, when the runway 12 is desired to be marked for covert (infrared or IR) landing operation, the plurality of marker light apparatus 10 are each placed along the runway with their plates 22 facing toward the approaching aircraft (not shown). Then the switch 54 is flipped to a second position shown in dashed line form at 64 in FIG. 4. In such second position of the switch 54, power source 52 is electrically connected (via lead 60, 66 and 68) through the switch to the other incandescent light bulb 42, turning it on and producing diffuse infrared illumination from the plate 22 in the housing end 18 which faces toward the approaching aircraft. Simultaneously, the one incandescent light bulb 40 aimed toward the one plate 20 is disconnected from the power source 52 and thereby turned off. Still further, when switch 54 is flipped to a third position shown in dashed line form at 70 in FIG. 4, both bulbs 40, 42 are disconnected and turned off.

It is readily apparent that the apparatus 10 just described provides an inexpensive and efficient device which by using incandescent light creates a diffuse runway marker light suitable for portable use in either overt or covert operations. Such a device is particularly suitable for use at runways located in austere environments.

It is thought that the diffuse incandescent runway marker light apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. Runway marker light apparatus, comprising:
   a. a housing having a pair of open opposite ends;
   b. a visible light diffusing plate mounted to said housing across a first of said ends;
   c. an infrared light diffusing plate mounted to said housing across the second said end;
   d. a pair of incandescent light sources disposed within said housing, each said source located adjacent one of said diffusing plates for directing a light beam through a respective corrresponding diffusing plate;
   e. an electrical power source operatively connected to said light sources; and
   f. switching means interconnecting said power souce and said light sources for selectively energizing only one of said light sources at a time to selectively direct a light beam through only one corresponding diffusing plate whereby only one of diffuse visible illumination and diffuse infrared illumination is projected at a time from said housing.

2. The runway marker light apparatus as recited in claim 1, wherein said housing includes a pair of generally parallel top and bottom walls and a pair of generally parallel side walls interconnecting said top and bottom walls, said walls defining therebetween said open opposite ends of said housing.

3. The runway marker light apparatus as recited in claim 1, wherein each said incandescent light source includes:
   a light socket base mounted within said housing near one of said diffusing plates;
   an incandescent light bulb mounted in said base; and
   a frusto-conical shaped reflector mounted to said base and generally surrounding said bulb, and opening outwardly toward a corresponding said diffusing plate for directing the light emanating from said bulb through said corresponding diffusing plate.

4. Diffuse incandescent marker light apparatus for aiding overt or covert aircraft landing operation at an austere runway, comprising:
   a. a housing having a pair of generally parallel top and bottom walls and a pair of generally parallel side walls interconnecting said top and bottom walls said walls defining a pair of open opposite ends of said housing;
   b. a visible light diffusing plate mounted to said housing across a first of said ends;
   c. an infrared light diffusing plate mounted to said housing across the second said end;
   d. a pair of light socket bases mounted within said housing, each said base mounted near a corresponding diffusing plate;
   e. an incandescent light bulb mounted in each said light socket base;
   f. a frusto-conical shaped reflector mounted to each said light socket base and generally surrounding a said bulb, each said reflector opening outwardly toward the corresponding said diffusing plate for directing the light emanating from said bulb through said corresponding diffusing plate;
   g. a d.c. battery operatively connected to said light bulbs for providing an electrical power source to said bulbs; and
   h. a three-position electrical switch mounted on the exterior of said housing and operatively interconnecting said battery and said light bulbs whereby at a first position of said switch power is provided to the light bulb near said visible light diffusing plate and the light bulb near said infrared light diffusing plate is off, at a second position of said switch power is provided to the light bulb near said infrared light diffusing plate and the light bulb near said visible light diffusing plate is off, and at a third position of said switch both said light bulbs are off.

* * * * *